US009329905B2

(12) United States Patent
Garrett (10) Patent No.: US 9,329,905 B2
(45) Date of Patent: May 3, 2016

(54) METHOD AND APPARATUS FOR CONFIGURING, MONITORING AND/OR MANAGING RESOURCE GROUPS INCLUDING A VIRTUAL MACHINE

(75) Inventor: Steven Harold Garrett, Westford, MA (US)

(73) Assignee: EMC CORPORATION, Hopkinton, MA (US)

( * ) Notice: Subject to any disclaimer, the term of this patent is extended or adjusted under 35 U.S.C. 154(b) by 1533 days.

(21) Appl. No.: 10/966,873

(22) Filed: Oct. 15, 2004

(65) Prior Publication Data

US 2006/0085785 A1   Apr. 20, 2006

(51) Int. Cl.
G06F 9/46 (2006.01)
G06F 9/455 (2006.01)
G06F 9/50 (2006.01)

(52) U.S. Cl.
CPC .......... *G06F 9/5077* (2013.01); *G06F 9/45558* (2013.01); *G06F 9/5061* (2013.01); *G06F 2009/45591* (2013.01); *G06F 2209/508* (2013.01)

(58) Field of Classification Search
CPC .............. G06F 11/203; G06F 11/2023; G06F 11/2033; G06F 2009/45575; G06F 2009/4557; G06F 9/5083
USPC .......................................... 718/100, 102, 104
See application file for complete search history.

(56) References Cited

U.S. PATENT DOCUMENTS

| | | | |
|---|---|---|---|
| 6,122,664 A | | 9/2000 | Boukobza et al. |
| 6,260,068 B1 | | 7/2001 | Zalewski et al. |
| 6,802,062 B1 * | 10/2004 | Oyamada et al. ................ 718/1 |
| 7,080,159 B2 * | 7/2006 | Chu et al. ....................... 709/246 |
| 7,203,944 B1 * | 4/2007 | van Rietschote et al. ..... 718/104 |
| 7,213,246 B1 * | 5/2007 | van Rietschote et al. ......... 718/1 |
| 7,552,437 B2 * | 6/2009 | Di Luoffo et al. ............. 718/104 |
| 7,900,206 B1 * | 3/2011 | Joshi et al. .................... 718/104 |
| 2002/0129126 A1 * | 9/2002 | Chu et al. ....................... 709/220 |
| 2002/0156884 A1 * | 10/2002 | Bertram et al. ............... 709/224 |

(Continued)

FOREIGN PATENT DOCUMENTS

| EP | 1 418 501 A1 | 5/2004 |
|---|---|---|
| EP | 1418501 A1 * | 5/2004 |
| WO | WO 0135242 * | 5/2001 |

OTHER PUBLICATIONS

VMware (VMware virtual center user's manual 1.0, Mar. 2004, pp. 1-360).*

(Continued)

*Primary Examiner* — Abdullah Al Kawsar
*Assistant Examiner* — Caroline H Arcos
(74) *Attorney, Agent, or Firm* — Dergosits & Noah LLP; Todd A. Noah (57) ABSTRACT

In one embodiment, methods and apparatus for configuring and/or monitoring a virtual machine in a resource group. In another embodiment, a method and apparatus for configuring and/or monitoring a resource group in accordance with a relocation policy that authorizes relocation of a resource from one cluster to another. In a further embodiment, a method and apparatus for configuring, monitoring and/or managing a resource group via a resource group tool having a user interface accessible via a web-services interface. In yet another embodiment, a method and apparatus for communicating between a console and at least one agent in a resource group tool via a web-services interface.

53 Claims, 7 Drawing Sheets

(56) References Cited

U.S. PATENT DOCUMENTS

| | | | |
|---|---|---|---|
| 2005/0160424 A1* | 7/2005 | Broussard et al. | 718/1 |
| 2005/0251802 A1* | 11/2005 | Bozek et al. | 718/1 |
| 2006/0085530 A1 | 4/2006 | Garrett | |
| 2006/0085668 A1 | 4/2006 | Garrett | |
| 2006/0190942 A1* | 8/2006 | Inoue et al. | 718/100 |

OTHER PUBLICATIONS

International Search Report.
"WMware VirtualCenter User's Manual, Version 1.0", VMware Incorporation, Mar. 19, 2004.
Vogels, W., et al., "The Design and Architecture of the Microsoft Cluster Service a Practical Approach to High-Availability and Scalability", Fault-Tolerant Computing 1998.
Taesombut et al. ,"Distributed Virtual Computers (DVC): Simplifying the Development of High Performance Grid Applications", 2004 IEEE International Symposium on Cluster Computing and the Grid, pp. 715-722, Apr. 19, 2004.
J. Craig Lowery, "Scaling-Out with Oracle® Grid Computing on Dell™ Hardware", Aug. 2003.
"High Availability Cluster Multi-Processing for AIX Administration Guide", Version 4.4.1, Jul. 2001, pp. 191-224.
Jeffery S. Chase, et al., "Dynamic Virtual Clusters in a Grid Site Manager", Proceedings of the 12$^{th}$ IEEE International Symposium on High Performance Distributed Computing (HPDC '03), pp. 90-100.
"High Availability Cluster Multi-Processing for AIX Administration Guide", Version 4.4.1, Jul. 2001, pp. 41-70.
VMWare Incorporation: "VMware GSX Server, Version 2.5.1", Apr. 15, 2004.
Brim M., e. Proceedings, First IEEE/ACM International Symposium May 15-18, 2001, pp. 386-393.
Zhengyu Liang, et al., ClusterProbe: An Open, Flexible and Scalable Cluster Monitoring Tool, International Workshop on Cluster Computing, Dec. 2, 1999, pp. 261-268.
Buyya R., "PARMON: a portable and scalable monitoring system for clusters," Software Practice and Experience, Wiley & Sons, Bognor Regis, GB, vol. 30, No. 7, Jun. 2000, pp. 723-739.
International Preliminary Report on Patentability for Application No. PCT/US2005/036945 mailed Apr. 26, 2007.
International Preliminary Report on Patentability for Application No. PCT/US205/037088 mailed Apr. 26, 2007.
Written Opinion of the International Searching Authority of International Application No. PCT/US2005/036945.
Written Opinion of the International Searching Authority of International Application No. PCT/US2005/037087.
Written Opinion of the International Searching Authority of International Application No. PCT/US2005/037088.
Garrett, Stephen H., U.S. Appl. No. 10/966,456, entitled "Method and Apparatus for Configuring, Monitoring and/or Managing Resource Groups Using Web Services," filed Oct. 15, 2004.
Garrett, Stephen H., U.S. Appl. No. 10/966,444, entitled "Method and Apparatus for Configuring, Monitoring and/or Managing Resource Groups," filed Oct. 15, 2004.

\* cited by examiner

METHOD AND APPARATUS FOR CONFIGURING, MONITORING AND/OR MANAGING RESOURCE GROUPS INCLUDING A VIRTUAL MACHINE

FIELD OF THE INVENTION

The present invention relates to configuring, monitoring and/or managing resource groups in a computer system.

BACKGROUND

Servers, storage devices, and other computer devices commonly are interconnected via a network, allowing for communication between these numerous devices and multiple end users. In some networked systems, availability monitors are employed to ensure the availability of application programs and/or other computer system resources. As a consequence, failure of a server hosting a user's application need not imply the termination of the application. Instead, the application may be relocated to another functioning server on the network, thereby ensuring application availability.

In general, an application is deemed "available" if an end user does not perceive any failures or severe performance degradation. Among other benefits, a computing network having a high availability monitor allows for automated response to failures and/or specified events. High availability solutions ensure that upon failure, at the application level, machine level, etc., affected resources can be relocated to functioning systems within the network. In addition, high availability solutions may also monitor and manage system maintenance, load fluctuations, business work flows, and other factors which influence performance and availability.

BRIEF DESCRIPTION OF DRAWINGS

In the drawings, in which like reference numerals represent like elements.

DETAILED DESCRIPTION

As mentioned above, networked computer systems having a number of nodes (e.g., servers and/or other computer devices) may have availability monitors that provide high availability of resources (e.g., applications). Among other benefits, such a system provides failover protection, wherein a resource may be relocated from a malfunctioning node to a functioning node. More generally, in an instance where a node fails, another node may host one or more services previously provided by the malfunctioning node, including but not limited to, execution of applications and access to storage and other computer devices. A migration of services across a network may also be initiated for reasons other than fault tolerance. For example, to redistribute workload on a network, to allow for hardware or software changes, to add a new device to a network, etc. The decisions involved in managing the network, may be directed manually by an administrator, or may be managed by an automated availability monitor.

Automated availability software monitors implement the processes involved in monitoring a network and taking actions to ensure availability. An example of such a software package is the Automated Availability Manager (AAM) offered by Legato, a division of EMC Corporation of Hopkinton, Mass. Automated availability monitors provide availability management capabilities in an automated manner that relieves the administrator from constantly monitoring network resources. Such automated availability monitors may respond to fatal events to provide failover protection, and may also increase network performance by monitoring and managing system maintenance, load fluctuations, and business work flows.

Figure 1:
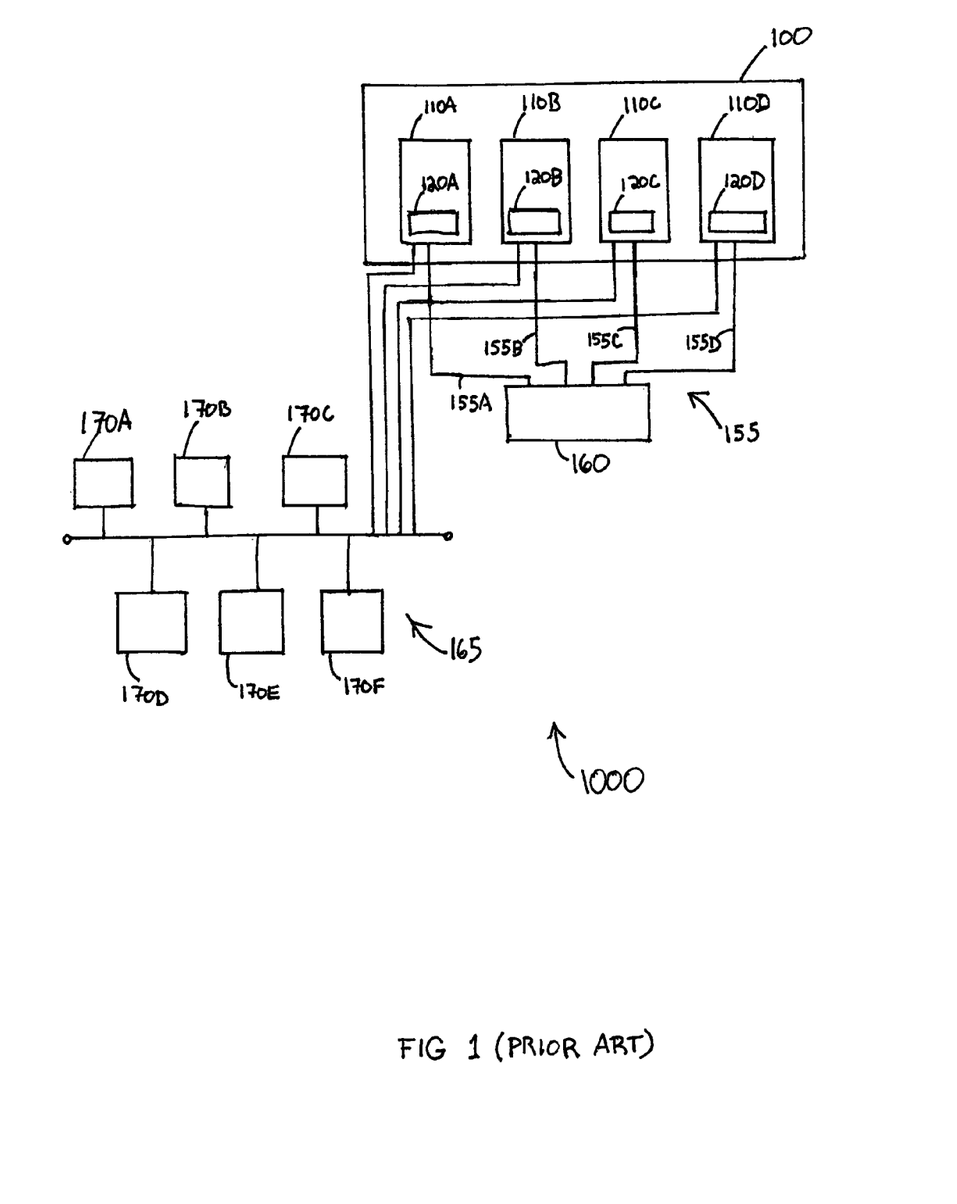
FIG. 1 is a block diagram showing an exemplary system on which automated availability software may be implemented.

FIG. 1 illustrates a conventional system 1000 managed by automatic availability software. The system 1000 includes a cluster 100, comprising a plurality of nodes (e.g., servers) 110A-110D, interconnected via a network 155. Network 155 may be any type of network that allows nodes 110A-110B to communicate among each other. In the specific configuration shown in FIG. 1, network 155 comprises a hub 160 and a plurality of network connections 155A-155D between the hub and the nodes which create a dedicated network that only handles communication between the nodes 110A-110D. In other implementations, network 155 can handle communication between other entities that are part of a larger network, for example clients (or end users) or other nodes. In the example of FIG. 1, the system 1000 also includes another network 165 that connects end users 170A-170F to the nodes 110. An end user may comprise any device having access to at least one node 110 across the network 165, (e.g., a client computer). Network 165 may be any type of network providing the desired connectivity, including a LAN, WAN, the Internet, other types of networks, or any combination thereof. The network 165 that connects other devices to the cluster may also be used to establish connectivity among the nodes 110A-110D in the cluster.

Systems on which availability software may execute are not limited to the particular implementation of FIG. 1, and may, in general, be implemented in numerous different system configurations using different network connection topologies.

In the illustrative configuration in FIG. 1, nodes 110A-110D in the cluster 100 may host applications accessed by clients 170A-170F. Examples of such applications include a word processor, web browser, database software, email service, etc. Thus, nodes 110 may host any number of services, including for example a webserver, database resource(s), or any other service or function. From the perspective of the end users 170, the cluster may be perceived as a single entity, with the end user being oblivious to which node is hosting which application. System 1000 may be managed by a system administrator who may monitor the state of applications, workload on nodes 110, and other metrics, thereby determining how to best respond to events, including failure or performance degradation. For example, failure on a specific node may prompt the administrator to migrate applications hosted on the failing node to other functioning nodes in the cluster 100.

Automated availability management (AAM) software has been developed to alleviate the need for manual intervention by a system administrator by providing for automated responses to failures and other events, thereby aiding in the management of resources associated with a cluster without requiring human intervention. For example, an automated availability monitor may be installed on the cluster 100 to monitor and control the various resources in the cluster 100 in FIG. 1. Numerous implementations are possible, including a distributed AAM monitor that includes automated availability agents 120A-120D installed on nodes 110A-D, respectively, with each agent serving to monitor and control the resources provided by the node 110A-D on which the agent resides. The automated availability agents may be installed on some or all of the nodes 110 and may be capable of performing numerous functions, including sensing system metrics and coordinating actions based on sensed events by acting unilaterally, or by communicating with other automated availability agents in the cluster, thereby detecting and resolving issues in the cluster, in turn ensuring availability.

While the AAM monitor illustrated in the embodiment of FIG. 1 comprises a distributed AAM monitor with an agent on each node, it should be appreciated that the aspects of the present invention described herein are not limited to use with an AAM monitor system having this or any other particular configuration, and can be used with other configurations, including non-distributed configurations.

The automated availability monitor 120 may monitor and maintain availability of resources provided by the cluster 100. A resource refers to any entity that may be monitored, controlled or managed, such as a service, application process, system path or logical address, IP address, node (e.g., a storage device or server), network information card (NIC), network device (e.g., a router or bridge), computer alias, database or any other suitable entity. Resource groups may be formed comprising one or more resources to be monitored, and the infrastructure (e.g., one or more data structures, commands, parameters, attributes, etc.) which enables the resources to be monitored by the automatic availability software. Resources groups may be created to monitor a collection of resources that each is provided by a single node or shared by multiple nodes. When referencing the functions performed by an automated availability monitor, the terms monitor, manage, control, etc. may be used together or interchangeably, and each refers to the types of functions described herein, such that no distinction is intended in meaning between these different terms.

Configuration of resource groups may include, but is not limited to, defining a set of resources to be managed, rules for responding to the startup and shutdown of the resources, procedures for selecting a failover node (e.g., to transfer a resource to in the event that the node hosting the resource fails), and commands for responding to triggering criteria of monitored metrics. For example, a resource group may include an application program (e.g., a word processor), executing on a host node, sensors by which application metrics are gathered, and triggers which monitor the sensors and report or act upon any conditions matching one or more rules. In some implementations, the resource group's sensors and triggers monitor and react to processes and node failures, and the automated availability monitor evaluates rules for mitigating the failure once a trigger fires.

Applicant has appreciated that conventional availability management solutions are incapable of including virtual machines within a monitored resource group. Virtual machines are software entities that virtualize or model computing systems that include both hardware and software. Virtual machine technology enables a number of distinct virtual machines to execute on a same hardware computing system. An example of virtual machine technology is VMWare ESX Server available from VMWare of Palo Alto, Calif., a division of EMC Corporation. Applicant has realized that the incorporation of an automated availability monitor to such systems would enable high availability capabilities for virtual machines on clusters. Thus, one embodiment of the invention enables the creation of resource groups that comprise virtual machines.

Conventional AAM systems employ communication techniques among the plurality of agents or components thereof that require that all of the components be installed on the same network. Applicant has appreciated that employing a web-services protocol for communication among the components of an AAM system can provide greater flexibility in configuring and managing a resource group. Thus, one embodiment of the invention enables the configuration and/or management of a resource group via a web-services protocol.

In conventional AAM systems, the physical nodes available for managing the resources in a resource group are limited to nodes within a cluster. As used herein, a cluster refers to one or more nodes that are grouped together to form a cluster that has an identifier, and information is associated with the cluster which identifies the group of nodes as belonging to the cluster. Network traffic directed to the cluster's identifier is routed to one or more of the physical nodes in the cluster. Applicant has appreciated that in some circumstances, it may be desirable to enable the configuration of a resource group in which resources can be relocated among two or more clusters. Thus, another embodiment of the invention enables the configuration of such resource groups.

Aspects of the present invention described herein relate to configuring, monitoring and/or managing resource groups, and can be employed in connection with any type of availability manager or monitor that is capable of performing any of these three functions in connection with a resource group. As used herein, the term resource group tool is used to generically describe any such tool, product (whether software, hardware or combination thereof) capable of configuring, monitoring and/or managing a resource group. Examples of such resource group tools can include an availability manager or monitor, but the aspects of the present invention described herein are not limited to products conventionally referred to with such labels, and can be used in connection with any tool capable of configuring a resource group, monitoring a resource group, managing a resource, or any combination of the foregoing.

As mentioned above, a virtual machine is an abstract representation of a computer system. A virtual machine may refer to a guest environment residing on a host machine, wherein the virtual machine provides facilities for a guest operating system, guest applications, and/or guest virtualized hardware. From the perspective of guest operating systems or applications running on a virtual machine, any low level instructions interfacing with guest hardware appear to directly execute on the guest hardware, but are instead virtualized by the virtual machine and may ultimately be passed to the actual hardware on the host machine. It should be appreciated that a virtual machine may be implemented in numerous ways, and the aspects of the present invention are not limited to use with virtual machines implemented in any particular manner.

Since multiple virtual machines may reside on one host machine, multiple guest operating systems and applications may execute simultaneously on one host machine. For example, multiple virtual machines can reside on any node coupled to a network. A user running an application on a virtual machine may not perceive the virtual machine nor the node location at which the virtual machine resides, but rather, from the perspective of the user, it is as if the application has the dedicated resources of a complete conventional physical computer system.

Figure 2:
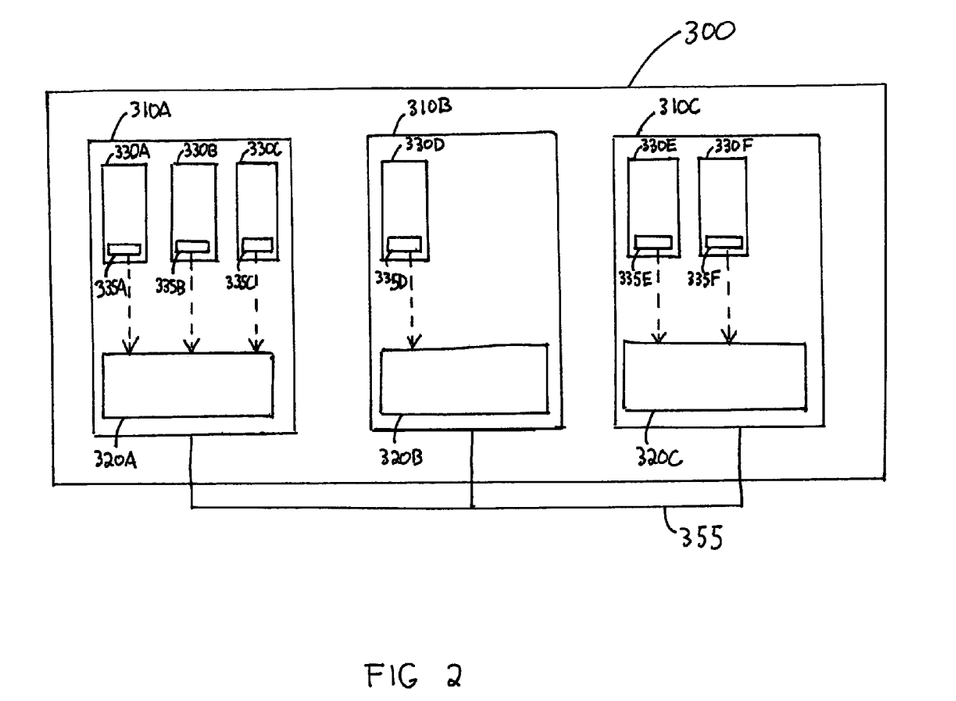
FIG. 2 is a block diagram showing an exemplary system on which virtual machines residing on a cluster are configured, monitored, and/or managed by an availability monitor according to one embodiment of the invention.

FIG. 2 illustrates an exemplary system implementing one embodiment of the invention in which a resource group may be formed to include one or more virtual machines. The system of FIG. 2 includes a cluster 300 including nodes 310A-310C interconnected via a network 355. Node 310A hosts virtual machines 330A-C, node 310B hosts virtual machine 330D, and node 310C hosts virtual machines 330E-F.

A given node 310 may host a number of virtual machines 330 based on the load that the node 310 can handle efficiently. Each virtual machine may in turn host a guest operating system and applications. FIG. 2 illustrates only the cluster nodes, but an end user network may also be coupled to the cluster 310 in much the same manner, as described and illustrated in FIG. 1, thereby allowing each user to execute applications on the virtual machines 330. FIG. 2 also presents a specific representation for a network 355, but the network is not limited to this specific implementation, as any network topology or type (including those described in connection with FIG. 1) may be utilized to interconnect the nodes of the cluster. In this respect, the aspects of the present invention that relate to forming resource group including one or more virtual machines can be implemented on clusters having any type of configuration.

In accordance with one embodiment of the invention, virtual machines have the potential to be dynamically relocated across physical host nodes in a cluster. Relocation of virtual machines might be initiated to redistribute workloads on nodes in a cluster, in anticipation of hardware maintenance, deployment or migration, for availability purposes, or for any other reason.

In the embodiment shown in FIG. 2, an automated availability monitor comprises agents 320A-320C that reside on nodes 310A-C, respectively. The monitor is capable of configuring, monitoring and/or managing one or more resource groups in the cluster 300, and may include the virtual machines 330 residing on the nodes 310 in any such resource group. While not shown in FIG. 2, the monitor may further comprise a console that communicates with the agents and enables the configuration of a resource group. The console may be resident in any suitable location (e.g., on one of the nodes in the cluster or elsewhere). The aspects of the present invention that relate to including a virtual machine in a resource group can be implemented in accordance with a monitor of any configuration type, and is not limited to use with an AAM system having a distributed configuration such as that shown in FIG. 2 wherein an agent 320 resides on each node, or any other particular type of configuration.

Virtual machines 330 may be configured, monitored, and/or managed along with any another resource by the agents 320. Examples of other resources include any of those disclosed above such as services, application processes, system paths or logical addresses, IP addresses, nodes (e.g., a storage devices or servers), network information cards (NIC), network devices (e.g., a router or bridge), computer aliases, databases, etc. As previously noted, the aspects of the present invention described herein are not limited to use with a monitor in which agents reside on all the nodes, nor to one in which the agent or agents configuring, monitoring and/or managing a given virtual machine reside on the same node as the node on which the virtual machine resides.

A resource group may be configured to define any number of functions related to monitoring and/or controlling a resource, including a virtual machine. The availability attributes for a virtual machine may be defined to address fault tolerance issuances (e.g., ensuring availability if a node fails) and/or performance issues. For example, a resource group may be configured to specify one or more performance goals or requirements (e.g., percentage of host processor usage allocated to a virtual machine, memory or storage resources on a host node, etc.) for the host node of a virtual machine, and the monitor may take actions to see that those goals or requirements are met.

For example, in one embodiment, a resource group including a virtual machine may define availability attributes for the virtual machine, a series of actions to initialize the virtual machine, and/or a series of actions to stop the virtual machine. A monitor may obtain information from a virtual machine to determine whether the virtual machine is functioning properly in any suitable manner, as the invention is not limited in this respect. Upon analysis of how the virtual machine is functioning, rules defined by the resource group may define actions to be executed in response to the state of the virtual machine. For example, if a virtual machine is not functioning as preferred or required on a given node, rules defined within the resource group may direct the relocation of the virtual machine to another node. The relocation can be achieved in any suitable manner, as the invention is not limited in this respect. As an example, some virtual machine technology (e.g., that available from VMWare) may provide a relocation service that the monitor can access to relocate a virtual machine from one node to another.

To allow for the monitoring of a virtual machine, the monitor (e.g., via agents) may gather information from the virtual machine in any suitable manner. In one embodiment, such information is gathered through the use of lightweight agents 335A-F within the virtual machines 330A-F. Lightweight agents 335 sense and collect metrics about the virtual machines or applications executing thereon, and these metrics can then be communicated to agents 320A-C. In FIG. 2, the lightweight agents 335 communicate with agents 320 residing on the same nodes 310, as illustrated by the dotted line communication paths in FIG. 2. However, it should be appreciated that a lightweight agent 335A-F within a given virtual machine 330 may alternatively communicate with an agent 320 residing on a different node 310, or with any component of a monitor, as the invention is not limited in this respect.

In another embodiment, the lightweight agents 335A-F may communicate with one or more agents 320 via a web-services protocol. Web-services is a standardized platform-independent communication protocol for exchanging information between computers without requiring each to have intimate knowledge of the nature of the other computer system. A web-services protocol may employ the Extensible Markup Language (XML), which is a cross-platform, flexible, text-based standard for representing data. The implementation details of current web-services protocols are known to those skilled in the art.

Although some embodiments of the invention may utilize a web-services protocol for the communication between lightweight agents 335 and agents 320, it should be appreciated that other communication protocols may be utilized.

In one embodiment, upon receiving sensed metrics from the lightweight agents 335A-F, the agents 320A-C determine whether to execute actions on the virtual machines based on an established admission control criteria that establishes preferred and/or required criteria for the operating environment and/or characteristics of a resource, in this case a virtual machine. For instance, the admission control criteria might establish minimum hardware requirements for the host of each virtual machine 335, such as an amount of memory on the physical computer node 310 hosting a virtual machine. Such admission control criteria can, in turn, allow for the generation of a preferred list of nodes 310 that a given resource, such as a virtual machine, should reside on. Admission control criteria may in addition, or alternatively, establish criteria for the amount of host resources allocated to a virtual machine, for example, by specifying a percentage of host processor utilization that should be allocated to the virtual machine.

It should be appreciated that the particular admission control criteria discussed above are merely examples, as the admission control criteria can establish any desired criteria for the operating environment and/or characteristics of the virtual machine or any other resource.

In conjunction with the admission control criteria, the monitor (e.g., the agents 320A-C) may manage movement of a virtual machine based upon a relocation policy that specifies the conditions under which a machine will be relocated, and that guides (along with the admission control criteria) the selection of a new host. For example, via a relocation policy, the monitor (e.g., the agents 320) may automatically determine to which node 310 a virtual machine 330 should be moved in the event of failure or degraded performance of its present host node, thereby automatically assuring the availability of the virtual machine.

Figure 3:
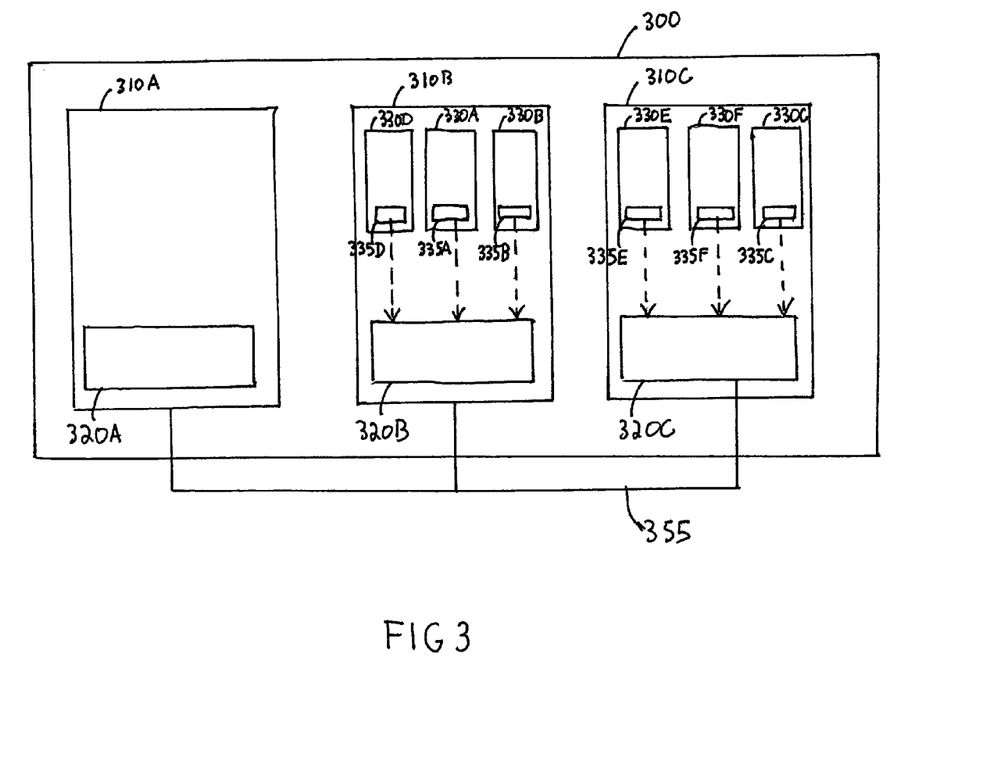
FIG. 3 illustrates the system of FIG. 2, but wherein several virtual machines residing on virtual machines have been relocated to different nodes by the availability monitor according to one embodiment of the invention.

FIG. 3 illustrates the cluster 300 of FIG. 2, but wherein the virtual machines 330A-330B have been relocated to node 310B, and virtual machine 330C has been relocated to node 310C. The relocation from node 310A may have been triggered by sensed metrics pertaining to applications running within the virtual machines (sent from the lightweight agents 335A-335C to agent 320A), by the failure of node 310A, or by any other suitable triggering event. A relocation policy may be utilized by the agents 320A-C to determine destination nodes to relocate each of the virtual machines 335A-335C.

Although the specific example illustrated in FIGS. 2-3 involves a resource group including only virtual machines, it should be appreciated that the invention is not limited in this respect, as resource groups may be configured that include any other type of resource in addition to the virtual machines.

Conventionally, a user interface for communicating with an automated availability monitor to configure resource groups must reside within the same network as the cluster, with the network often disposed behind a firewall to protect the network from unauthorized outside access via a connected public network, like the Internet. In addition, communication between the user interface and the components of the automated availability monitor performing cluster configuration, monitoring and/or control is conventionally performed using a particular dedicated communication protocol, requiring that all of the components of the monitor be located within the same network as the cluster(s) being monitored (e.g., behind the same firewall) and be capable of communicating using the dedicated protocol. Such restrictions require that an administrator be onsite to interact with the conventional cluster management software.

In accordance with one embodiment of the invention, a web-services protocol is employed for communication between a user interface of an automated availability monitor and other components thereof for configuring, monitoring and/or controlling response groups.

In one embodiment, providing a web-services interface for an automated availability monitor allows for location flexibility when configuring, monitoring and/or controlling a resource group, wherein the monitor can be accessed from outside the network of the cluster, even if the cluster is protected by a firewall. For example, via a web-services interface, an administrator may communicate with a resource group configuration and/or management tool from a computer outside the cluster network (even when secured behind a firewall), for example using the Internet, thereby allowing the administrator to configure, monitor and/or control one or more resource groups without needing to access the monitor or configuration tool from a computer on the same network.

While the use of a web-services interface enables communication with a resource group configuration and/or management tool from a location outside the cluster network, it should be appreciated that a web-services interface also may be utilized to configure, monitor, and/or control a resource group from a computer on the same network. The use of a web-services interface enables communication between a computer used by an administrator and the resource group configuration and/or management tool in a platform-independent manner as described above.

In the discussion above, the web-services interface has been described as being employed between a user interface and a resource group configuration and/or management tool. In one embodiment, the user interface accessible via a web-services interface (e.g., by accessing a publicly available website) provides the ability to configure resource groups, and also to monitor and control previously configured resource groups. However, it should be appreciated that the embodiment of the present invention that relates to accessing a resource group tool via a web-services interface is not limited in this respect, as the user interface accessible via a web-services interface could alternatively provide the ability to perform any subset of activities relating to configuring, monitoring and controlling resource groups (e.g., to allow configuring but not monitoring or monitoring but not configuring), such that any other activities may require access on the same network as the resource group cluster.

Figure 4:
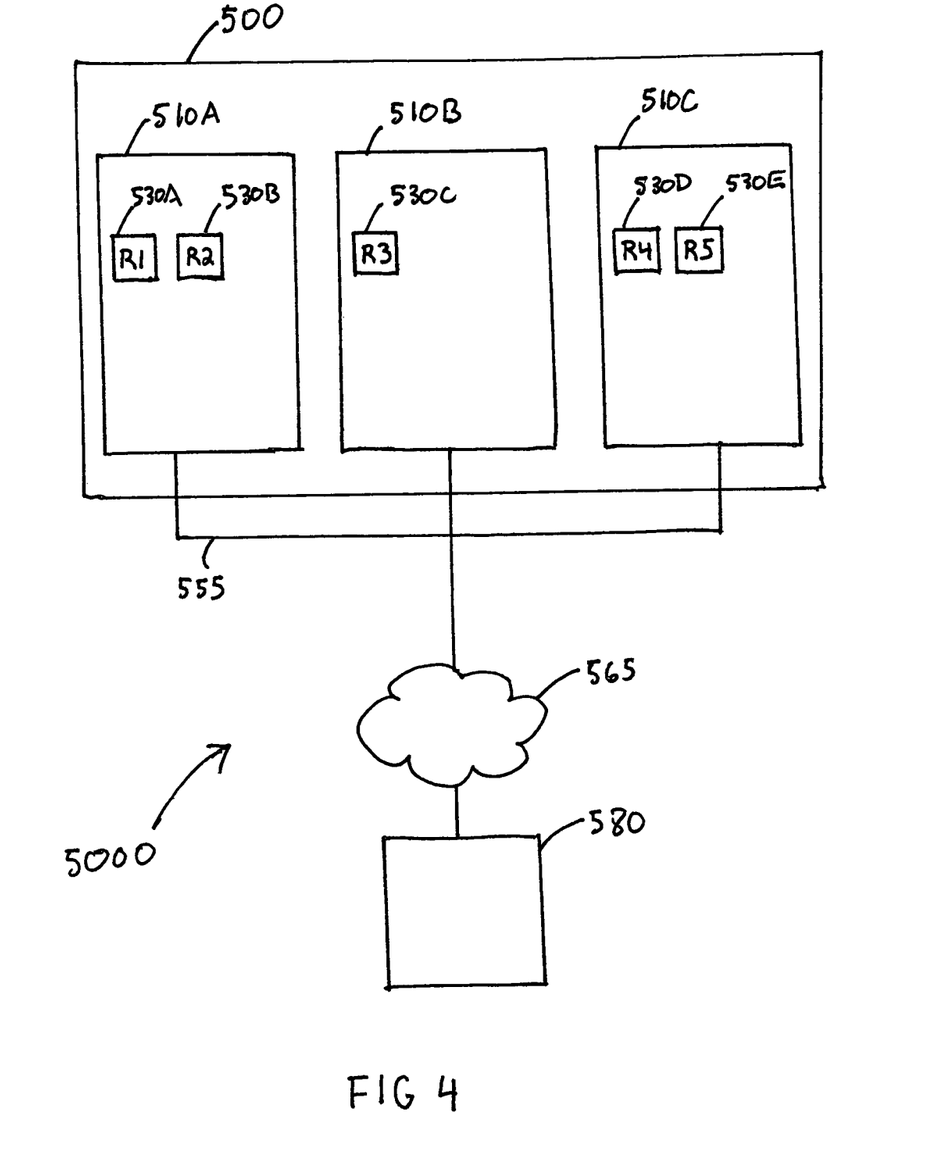
FIG. 4 is a block diagram showing an exemplary system where cluster resources are configured, monitored, and/or managed from a second computer via a web-services interface in accordance with one embodiment of the invention.

One embodiment of the aspect of the invention that relates to the use of a web-services interface accessing a resource group configuration and/or management tool will now be described referring to FIG. 4, which illustrates a computer system 5000 comprising a cluster 500, a computer 580 and a network 565 that couples the computer 580 to the cluster. The cluster 500 comprises a set of physical computer nodes 510A-510C, which posses resources 530A-530E. As discussed above physical computer nodes 510A-510C may comprise any suitable device, such as a server, a storage system or any other device having one or more resources to be monitored. Physical clusters are interconnected via a network 555, which may be any type of network in any topology in much the same manner as discussed above.

The network 565 may be any type of network connection allowing for communication between the cluster 500 and the computer 580. In one embodiment, the cluster 500 and network 555 may be part of a secure private network and may be protected by a firewall. In one embodiment, the network 565 may be a public network (e.g., the Internet). The computer 580 may be part of the same private network as the cluster 500, may be part of a different private network protected by a different firewall, may be unprotected by any firewall, or may be arranged in any other configuration that provides access to the public network 565 to communicate via a web-services interface with the cluster 500.

The computer 580 provides a user interface allowing for communication, through network 565, to a configuration tool that enables the configuration of resource groups on the cluster 500. Via the use of a web-services interface, the computer 580 communicates with the configuration tool by transmitting and receiving communication signals in accordance with a web-services protocol. Communication via a web-services protocol and interface allows the computer 580 to interact with a resource group configuration tool residing on any computer connected to the public network 565. In one embodiment, the configuration tool, which may be a console as described above, is disposed on the cluster 500 (e.g., on any one or a plurality of the physical computer nodes 510A-510C on the cluster 500). Via the web-services interface, the user can use the computer 580 to communicate with the configuration tool, allowing the user to configure, monitor and/or control resources residing on the physical computer nodes 510A-510C in cluster 500 in the same manner as a user can using conventional techniques for communicating with the configuration tool from a computer within the cluster 500. For example, the user may direct the configuration of a resource group on the cluster by defining the resources to be managed, sensors for sensing metrics, rules for responding to the startup and shutdown of the resources, procedures for selecting a failover node, commands for responding to triggering criteria of sensed metrics, etc.

As discussed above, in accordance with one embodiment of the present invention, an interface for a configuration tool that enables the configuration of one or resource groups is made available by a web-services interface. Alternatively, in accordance with another embodiment of the present invention, an interface for monitoring one or more previously configured resource groups can be made available by a web-services interface. Furthermore, in accordance with one embodiment of the present invention, such functionality is combined, such that an interface can be made available to an AAM monitor or other suitable tool to enable both the configuring and monitoring of resource groups by a web-services interface.

The web-services interface for the configuration and/or monitoring tool can be implemented in any suit or manner, as the present invention is not limited in this respect. In accordance with one embodiment of the present invention, the user interface for the configuration and/or monitoring tool can be made available at a publicly accessible address on the network 565, in much the same manner as a web site. In accordance with this embodiment of the present invention, the user interface can then be accessed by any computer 580 with access to the network 565 and a browser.

Figure 5:
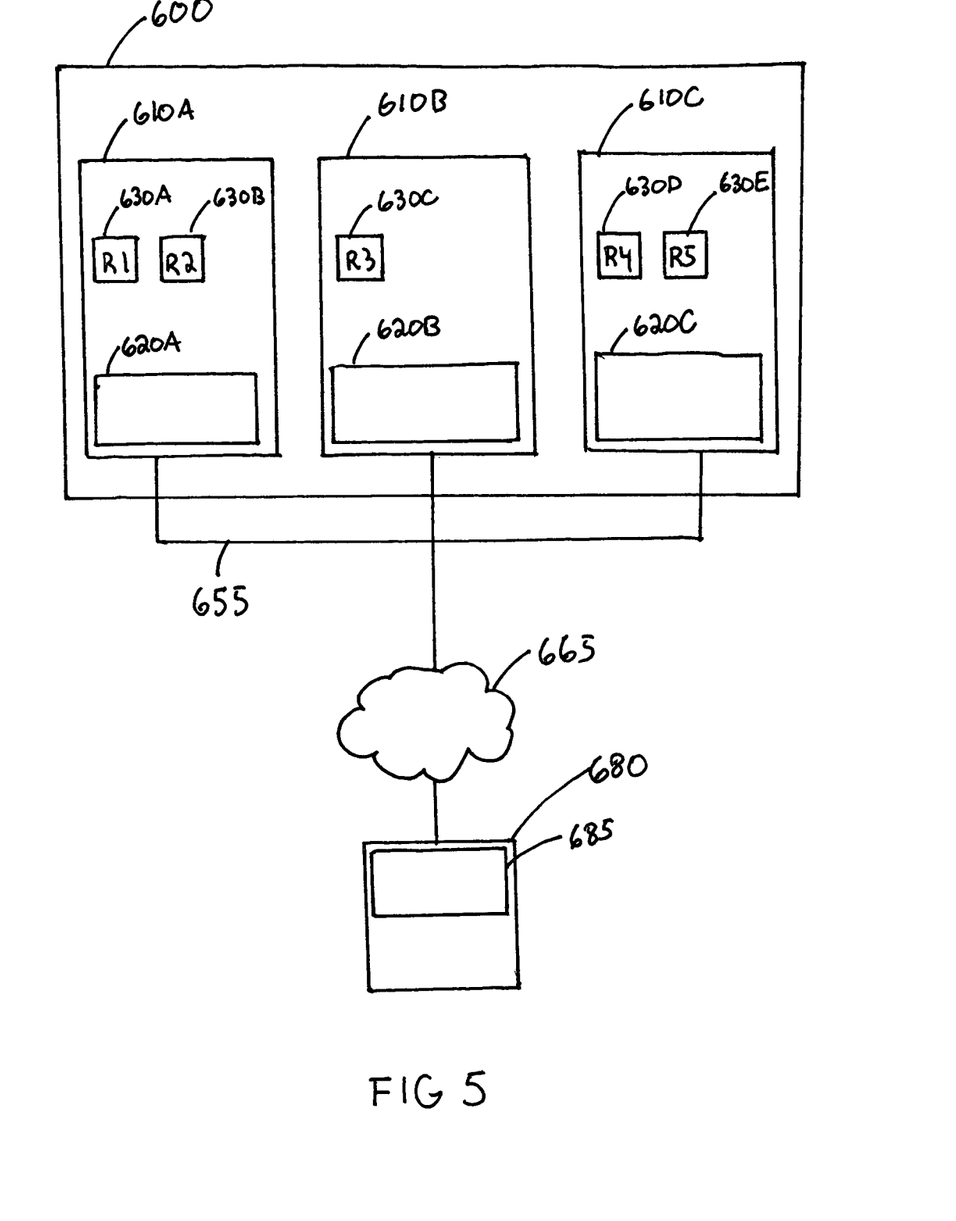
FIG. 5 is a block diagram showing an exemplary system having a resource group configuration tool comprising a console with a user interface and a plurality of agents on nodes in the system, wherein the console and the nodes communicate via a web-services interface in accordance with one embodiment of the invention.

FIG. 5 illustrates another embodiment of the invention, that relates to a distributed monitoring system, wherein communication between two or more elements of the monitoring system can be conducted using a web-services interface. In the embodiment of FIG. 5, the monitoring system comprises agents 620A-C residing on the physical computer nodes 610A-610C of a cluster 600, and a console 685 that provides a user interface for the monitoring system to enable the configuration of resource groups on the cluster 600. Console 685 may be implemented in any suitable way, such as with instructions encoded on a computer-readable medium accessible to and executed by a processor in second computer 680. In one embodiment, console 685 may include instructions which define the presentation of a graphical user interface, so that the user may provide one or more commands via the graphical user interface to configure a resource group.

Console 685 communicates with the agents 620A-C residing on the physical computer nodes 610A-C. Agents 620A-C may be implemented in any suitable way, for example, with instructions encoded on a computer-readable medium (e.g., a memory or other storage device) which is accessible to, and executed by, a processor in corresponding physical computer node 610A-C. In FIG. 5, agents 620A-C are installed as software on the same physical computer nodes 610A-C on which one or more resources 630A-E may also reside, and can configure, monitor, and/or control the resources 630A-E on the same node. However, as discussed above, the embodiments of the invention described herein are not limited to use with a monitor having this type of configuration. For example, an agent may be installed on a device separate from a node on which a resource configured or monitored thereby resides, and the device on which the agent resides may be any computing device capable of executing the agent. Thus, although an agent is resident on each node in the cluster 600 in FIG. 5, the aspects of the present invention described herein can be used with other configurations that employ fewer agents (e.g., one per cluster).

In one embodiment, communication between the console 685 and the agents 620A-C is achieved via a web-services protocol and interface. As with the description above in connection with the second computer 580 and the cluster 500 in FIG. 4, the network 665 can be a public or private network, the computer 680 on which the console 685 resides can be in a same private network as the cluster, or the computer 680 can be outside of a firewall that protects the cluster 600. Since the console 680 can be disposed outside of a firewall that protects the cluster 600 and the agents 620A-C disposed thereon, the use of the web-services interface for communication between the console 685 and the agents 620 can enable the console to be disposed remotely from the cluster (e.g., in another room, building, city, state or country).

It should be appreciated that when the console 685 and agents 620A-C communicate via a web-services interface and protocol, such communication can be implemented in any suitable manner. For example, the console 685 may have an agent interface that is adapted to communicate with the agents 620A-C, and the agent interface can be exported via a web-services protocol, such that the agents 620A-C can access the console by employing a browser or other suitable technique on the agents. In addition or alternatively, the agents 620A-C may have a console interface that is adapted for communication with the console 685, and the console interfaces for the agents may be exported via a web-services protocol, such that the console 685 may access the agents using a browser or other suitable technique on the console.

While the console 685 has been described above as providing the ability to configure a resource group by using a web-services interface to communicate with the agents 620A-C, it should be further appreciated that in one embodiment of the invention, the console 685 may provide the ability to monitor a previously configured resource group that includes resources monitored by the agents 620A-C, and that such a monitoring function can be performed either in addition to the ability to configure a resource group via the console 685 or instead of the ability to configure a resource group via the console 685. It should be appreciated that this would enable a resource group to be monitored remotely, rather than via a computer connected to the same network as the cluster 600.

In accordance with one embodiment of the present invention, the ability to decouple the user interface (e.g., the console 685 in FIG. 5) for configuring and/or monitoring a resource group from the cluster on which the resources are being monitored can enable a single console interface to be used to manage resource groups on multiple clusters, including those behind different private networks.

In conventional availability monitoring and management systems, resource groups are defined for resources within a particular cluster of physical nodes, and the physical components available to the availability monitoring system for satisfying the availability requirements for a resource group are limited to those within the cluster. In configuring a computer system, the infrastructure employed in defining a cluster can impose some practical limitations on the number of physical components that can desirably be grouped together in a single cluster. The infrastructure to define a cluster includes an identifier (e.g., a name) that is assigned to the cluster, a list of the physical components (e.g., nodes) that are included in the cluster, and the cluster-level communication between the nodes to support the configuration of one or more resource groups on the cluster. For example, typical resource groups are defined to support continued availability of one or more resources on the cluster, even in the event of a failure of a node in the cluster on which a resource may initially reside. To enable the nodes within a cluster to function together to provide such availability functionality, conventional monitoring systems employ cluster-level communication among the nodes in the cluster, so that the nodes in the cluster are aware of the health of the other nodes and whether actions should to be taken to ensure the continued availability of a resource in the event of a node failure. Examples of such cluster-level communication can include heartbeat or polling communications among the nodes in a cluster so that the nodes can collectively monitor the health and continued viability of the other nodes.

As mentioned above, in view of the infrastructure employed in supporting a cluster, it may be desirable to limit the number of physical nodes that are grouped together in any particular cluster. For example, if the number of nodes within a cluster becomes overly large, the cluster-level communication among the nodes to support the cluster may become overly burdensome, and consume an undesirably large percentage of network bandwidth for a network interconnecting the nodes of the cluster. Thus, when using conventional monitoring systems, users often limit the number of physical nodes that are interconnected in any one cluster.

A downside to restrictions on the number of nodes that may be desirably grouped together in any particular cluster is that it may impose undesirable limitations on actions that can be taken to meet the desired availability requirements for a particular resource group. For example, a particular resource group may have a set of desired operating environment criteria that is met by only a small number of nodes within a particular group of nodes that are desirable to group together in a particular cluster. Applicant has appreciated that in some circumstances, it may be desirable to configure a resource group to enable it to use physical nodes or components outside of the cluster to satisfy the availability requirements for a resource group. Thus, in accordance with one embodiment of the present invention, a resource group can be configured to include a relocation policy for at least one resource in the group that authorizes the relocation of the resource to a different cluster.

In accordance with one embodiment of the present invention, the aspect of the present invention that relates to allowing resources within a resource group to be relocated outside of the cluster can be used in conjunction with the aspect of the present invention that employs web-services to allow communication among the components of a automated availability monitor to provide increased flexibility in terms of relocating the resources. For example, within a particular enterprise, there may be multiple private networks (e.g., located in different geographic locations) that each is secured behind its own firewall so that they cannot communicate directly using other communication protocols. However, each of the private networks may be connected to a public network (e.g., the Internet), and each may be accessible via the use of a web-services protocol. Thus, in accordance with one embodiment of the present invention, a web-services protocol and interface can be used to facilitate relocation of a resource from a cluster on one private network to a cluster on another.

While the combination with the aspect of the present invention that relates to using a web-services interface and protocol for communication among the components of a monitoring tool is advantageous, it should be appreciated that the aspect of the present invention that relates to relocating resources outside of a cluster is not limited in this respect, and can be used to relocate resources outside of a cluster in numerous other circumstances, including moving resources to a cluster disposed behind the same firewall, or for use with any suitable communication protocol for communicating between the various components of the monitoring tool.

Figure 6:
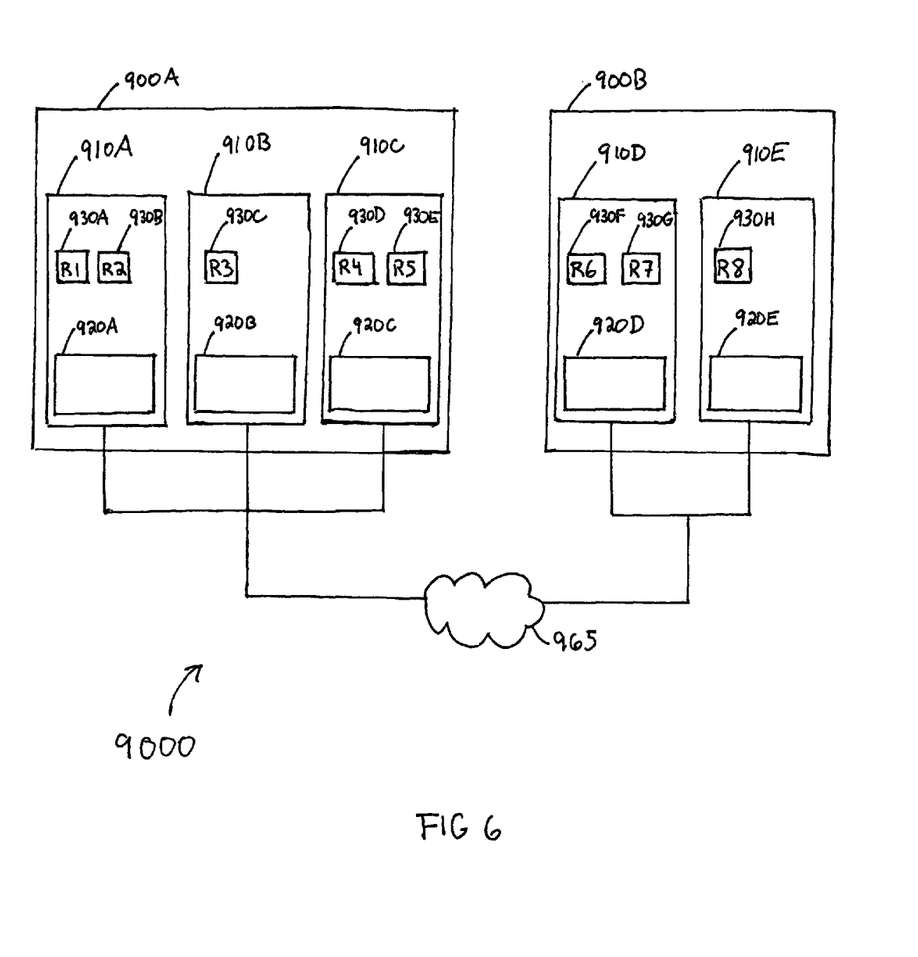
FIG. 6 a block diagram showing an exemplary system where resources from a first cluster may be relocated to a second cluster in accordance with one embodiment of the invention.

FIG. 6 illustrates one embodiment, wherein a system 9000 comprises two clusters 900A and a cluster 900B. Cluster 900A comprises physical computer nodes 910A-910C which host resources 930A-930E. Resources 930A-930E are monitored by a monitoring system that includes agents 920A-C. Cluster 900B comprises physical computer nodes 910D-910E which host resources 930F-930H. Resources 930F-930H are monitored by a monitoring system that includes agents 920D-E.

The clusters 900A and 900B are interconnected via a network 965. As discussed above, the network 965 may be a public network, with one or more of the clusters 900A and 900B being disposed on a private network behind a firewall. However, as discussed above, the aspect of the present invention that relates to cluster-to-cluster relocation is not limited in this respect, as the network 965 can be any type of network for connecting the clusters 900A, 900B, which can alternatively be located behind the same firewall. As used herein, the term a firewall is used broadly to refer to any security technique for protecting network components from outside access.

In the embodiment shown, a resource group comprising one or more resources 930A-E in the first cluster 900A is configured in accordance with a relocation policy that authorizes, under specified conditions, relocation of at least one of the resources to the second cluster 900B. In much the same manner as discussed above, the specified conditions under which relocation will take place may be defined in accordance with any suitable admission control criteria, and the destination for a relocated resource may be specified in accordance with any suitable relocation policy, as the present invention is not limited in this respect.

Figure 7:
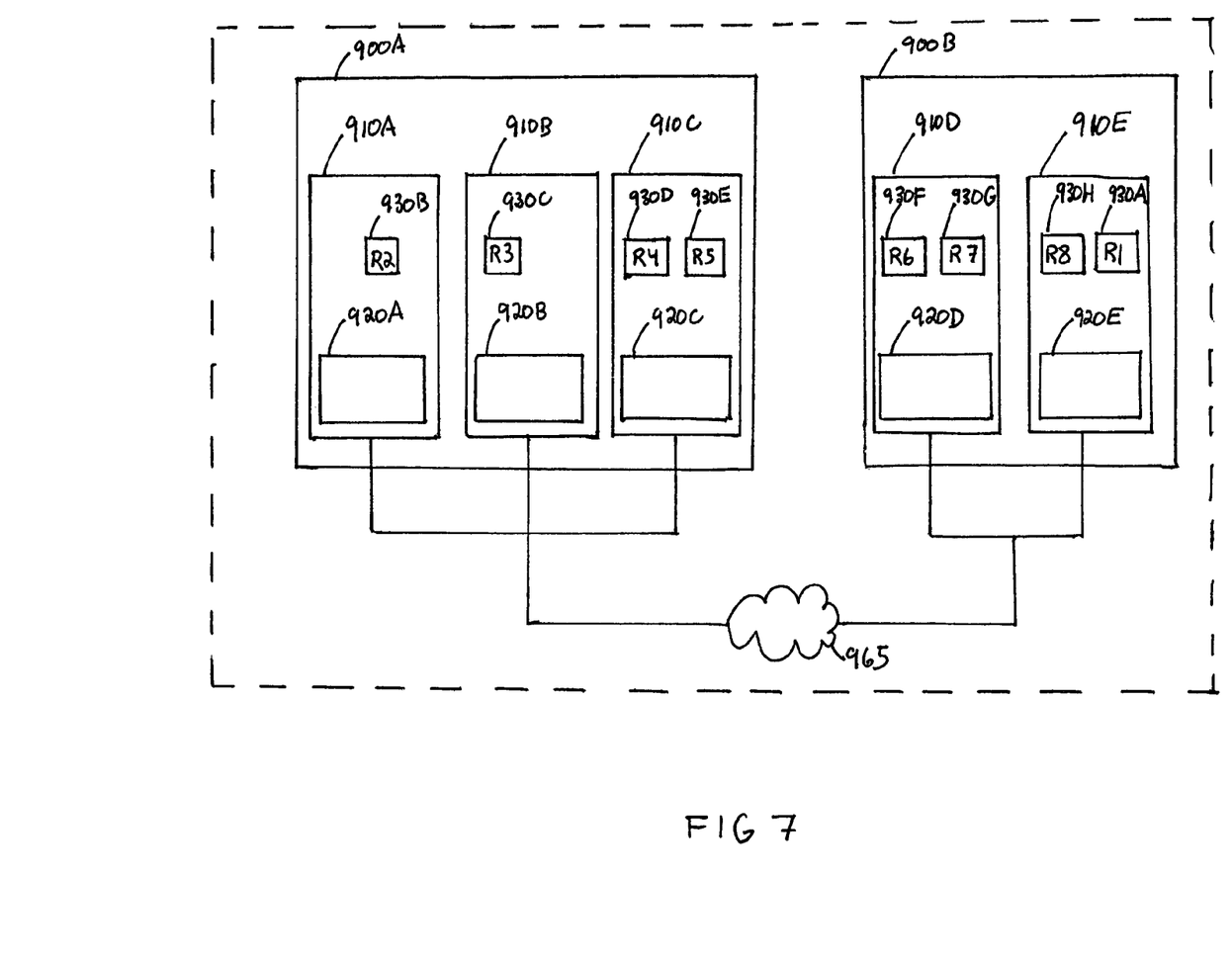
FIG. 7 a block diagram showing the exemplary system of FIG. 6, but wherein a resource from the first cluster has been relocated to a second cluster in accordance with one embodiment of the invention.

In the example shown above, a resource group comprising resources 930A-E is configured in accordance with a relocation policy that authorizes the relocation of resource 930A to the cluster 900B. Upon the occurrence of a specified condition, the resource 930A is relocated to the cluster 900B, as shown in FIG. 7. The aspects of the present invention that relate to cluster-to-cluster relocation are not limited to any particular conditions that may trigger the relocation, as any suitable conditions can be employed, including any of the type of conditions that would conventionally result in relocation of a resource from one node to another within a cluster, or any other event that an administrator configuring a resource group may desire to trigger such relocation.

The relocation of the resource 930A can be performed in any suitable manner. As discussed above, in accordance with one embodiment of the present invention, a web-services interface and protocol can be used for communication between the clusters 900A and 900B to facilitate relocation of the resource 930A. However, it should be appreciated that the present invention is not limited in this respect, and that any suitable communication technique can be employed for communicating between the clusters 900A and 900B to facilitate the relocation.

In accordance with one embodiment of the present invention, a technique is employed for communicating between the clusters 900A and 900B in a manner that is generic to the communication protocols employed by any particular availability monitor, such that a resource can be relocated from one cluster to another, even if the clusters are configured and managed by availability monitoring tools provided by different vendors. In this respect, Applicant has appreciated that while different availability monitor vendors use different labels for referencing the resources managed thereby, most availability monitoring systems have the capability of monitoring and managing the same or similar types of resources. Thus, in accordance with one embodiment of the present invention, a meta language can be used that is independent of the language used by any particular vendor, and provides for the communication to facilitate relocation of a resource from a first cluster managed by an availability monitor provided by a first vendor to a second cluster managed by an availability monitor from a second vendor.

In accordance with one embodiment of the present invention, XML is employed as the meta language to enable communication between clusters managed by availability products from different vendors, and the XML language is used in accordance with a web-services interface. Availability monitor products typically provide a user interface that enable resource groups to be configured, and the XML (Extensible Markup Language) language can be employed to communicate at a similar level.

While XML (via web-services) is used as a meta language in accordance with one embodiment of the present invention, it should be appreciated that the aspect of the present invention that relates to cluster-to-cluster relocation is not limited to using XML as the meta language for cluster-to-cluster communication, as any suitable language can be employed.

For example, another generic language can be employed to facilitate communication between availability monitoring products provided by different vendors, or proprietary communication protocols can be employed to facilitate relocation from one cluster to another when both are managed by availability monitoring products from the same vendor.

It should be appreciated that when a resource from one cluster (e.g., 900A in FIG. 7) has been moved to another cluster (e.g., 900B), the two clusters can, in at least some limited respects, be considered to form a larger meta cluster, as the two clusters will act together to provide the availability of at least one resource group that is supported by both clusters. In accordance with one embodiment of the present invention, the two (or more) clusters can engage in meta cluster communication that is similar in many respects to the cluster-level infrastructure communication discussed above but can be limited to the communication desired to ensure the availability of the resource group supported by the two clusters. In accordance with one embodiment of the present invention, such meta cluster communication is not initiated upon the configuration of a resource group in accordance with a relocation policy that authorizes relocation to another cluster, but rather, is activated when a resource group is actually relocated to another cluster to form the meta cluster.

It should be further appreciated that a destination cluster to which a resource is relocated from another cluster should be provided with configuration information instructing it as to the desired behavior for supporting the availability of the relocated resource. Such configuration information can be provided to the destination cluster (e.g., cluster 900B in the example above) when the destination cluster is initially configured, or alternatively, can be provided at the time the resource is relocated to the destination cluster.

In the discussion above, a meta cluster is described as being formed to support one or more resource groups and includes two clusters. However, it should be appreciated that the aspect of the present invention that relates to cluster-to-cluster relocation and the formation of a meta cluster is not limited to forming a meta cluster that comprises two clusters, as a meta cluster can be formed that includes three or more clusters.

As should be appreciated from the foregoing, there are numerous aspects of the present invention described herein that can be used independently of one another, including the aspects that relate to web-services communication, cluster-to-cluster relocation and the inclusion of a virtual machine in a resource group. However, it should also be appreciated that in some embodiments, all of the above-described features can be used together, or any combination or subset of the features described above can also be employed together in a particular implementation, as the aspects of the present invention are not limited in this respect.

As discussed above, aspects of the present invention relate to use with tools for configuring and/or monitoring resource groups in a cluster. The references used herein to managing and monitoring a resource group are used interchangeably, as our references to software tools for performing these functions, including automated availability monitors and managers. As discussed above, the aspects of the present invention described herein are not limited to such tools having any particular configurations, and can be employed with any tools for configuring and monitoring resource groups.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method for managing a virtual machine, the method comprising:
    monitoring, by a first availability monitor comprising a first agent resident on a first computer, a virtual machine hosted by the first computer located in a first cluster, the first computer being identified by a meta language, and the first agent communicating with the first availability monitor using a first communications protocol;
    relocating, based on the monitoring, the virtual machine to a second computer upon the occurrence of a triggering event, the second computer being located in a second cluster, the second computer being identified by the meta language, and the second computer is monitored by a second availability monitor comprising a second agent resident on the second computer, wherein the second agent communicating with the second availability monitor using a second communications protocol, wherein the meta language that enables the first availability monitor to communicate with the second availability monitor is different from the first communications protocol and the second communications protocol, and wherein the first availability monitor is distinct from the second availability monitor and uses a first referencing system to identify computers included in the first cluster and the second availability monitor uses a second referencing system to identify computers included in the second cluster and wherein the first referencing system is different than the second referencing system;
    executing the relocated virtual machine on the second computer; and monitoring, by the second availability monitor, the relocated virtual machine.

2. The method of claim 1, wherein the virtual machine comprises an abstract representation of a computer system.

3. The method of claim 1, wherein the triggering event is a failure of an application program executing on the virtual machine.

4. The method of claim 1, wherein the triggering event is a degradation of the performance of the virtual machine.

5. The method of claim 1, wherein the triggering event is unavailability of the virtual machine.

6. The method of claim 1, wherein the triggering event is exceeding a percentage of the usage of the first computer processor allocated to the virtual machine.

7. The method of claim 1, wherein the triggering event is in accordance with a relocation policy.

8. The method of claim 1, wherein relocating the virtual machine to the second computer is in accordance with a relocation policy.

9. The method of claim 1, wherein the first availability monitor and the second availability monitor are automated.

10. The method of claim 1, wherein the first availability monitor and the second availability monitor are accessed using a web interface.

11. The method of claim 10, wherein relocating is performed using the web interface.

12. The method of claim 11, further comprising:
    selecting the second computer using the web interface prior to relocating the virtual machine to the second computer.

13. The method of claim 10, further comprising defining the triggering event using the web interface.

14. The method of claim 10, wherein the web interface resides on a computer having access to the first and second availability monitors.

15. The method of claim 1, wherein the first and second availability monitors are accessed using the meta language.

16. The method of claim 1, further comprising:
    defining a relocation policy prior to monitoring the virtual machine executing on the first computer;
    wherein monitoring the virtual machine is in accordance with the relocation policy; and,
    wherein relocating the virtual machine to the second computer is in accordance with the relocation policy.

17. The method of claim 16, wherein defining the relocation policy is performed using a web interface.

18. The method of claim 1 wherein the virtual machine hosts a guest operating system.

19. A computer program product, comprising a non-transitory computer storage medium having a computer readable program code embodied therein, the computer readable program code including instructions to be executed by one or more processors to:
    monitor, by a first availability monitor comprising a first agent resident on a first computer, a virtual machine hosted by the first computer located in a first cluster, the first computer being identified by a meta language, and the first agent communicating with the first availability monitor using a first communications protocol;

relocate, based on the monitoring, the virtual machine to a second computer upon the occurrence of a triggering event, the second computer being located in a second cluster, the second computer being identified by the meta language, and the second computer is monitored by a second availability monitor comprising a second agent resident on the second computer, wherein the second agent communicating with the second availability monitor using a second communications protocol, wherein the meta language that enables the first availability monitor to communicate with the second availability monitor is different from the first communications protocol and the second communications protocol and wherein the first availability monitor is distinct from the second availability monitor and uses a first referencing system to identify computers included in the first cluster and the second availability monitor uses a second referencing system to identify computers included in the second cluster and wherein the first referencing system is different than the second referencing system;

execute the relocated virtual machine on the second computer; and monitor, by the second availability monitor, the relocated virtual machine.

20. The computer program product of claim 19, wherein the virtual machine comprises an abstract representation of a computer system.

21. The computer program product of claim 19, wherein the triggering event is a failure of an application program executing on the virtual machine.

22. The computer program product of claim 19, wherein the triggering event is a degradation of the performance of the virtual machine.

23. The computer program product of claim 19, wherein the triggering event is unavailability of the virtual machine.

24. The computer program product of claim 19, wherein the triggering event is exceeding a percentage of the usage of the first computer processor allocated to the virtual machine.

25. The computer program product of claim 19, wherein the triggering event is in accordance with a relocation policy.

26. The computer program product of claim 19, wherein relocating the virtual machine to the second computer is in accordance with a relocation policy.

27. The computer program product of claim 19, wherein the first availability monitor and the second availability monitor are automated.

28. The computer program product of claim 19, wherein the first availability monitor and the second availability monitor are accessed using a web interface.

29. The computer program product of claim 28, wherein relocating is performed using the web interface.

30. The computer program product of claim 29, further comprising instructions to:

select the second computer using the web interface prior to relocating the virtual machine to the second computer.

31. The computer program product of claim 28, further comprising instructions to define the triggering event using the web interface.

32. The computer program product of claim 28, wherein the web interface resides on a computer having access to the first and second availability monitors.

33. The computer program product of claim 19, wherein the first and second availability monitors are accessed using the meta language.

34. The computer program product of claim 19, further comprising instructions to:

define a relocation policy prior to monitoring the virtual machine executing on the first computer;

wherein monitoring the virtual machine is in accordance with the relocation policy; and, wherein relocating the virtual machine to the second computer is in accordance with the relocation policy.

35. The computer program product of claim 34, wherein defining the relocation policy is performed using a web interface.

36. A computer system comprising:

a first cluster of physical computer nodes, each physical computer node comprising a processor, including a first computer node, the first computer node configured to host a virtual machine, and the first physical computer node being identified by a meta language;

a first availability monitor comprising a first agent resident on the first physical computer node configured to monitor the first cluster of physical computer nodes and the virtual machine, the first availability monitor being further configured to communicate with the first agent using a first communications protocol;

a second cluster of physical computer nodes including a second physical computer node, the second physical computer node being identified by the meta language;

a second availability monitor comprising a second agent resident on the second physical computer node configured to monitor the second cluster of computer nodes, the second availability monitor being further configured to communicate with the second agent using a second communications protocol; and a web interface configured to use the meta language to relocate the virtual machine from the first physical computer node to the second physical computer node upon the occurrence of a triggering event sensed by the first availability monitor, wherein the meta language that enables the first availability monitor to communicate with the second availability monitor is different from the first communications protocol and the second communications protocol and wherein the first availability monitor is distinct from the second availability monitor and uses a first referencing system to identify computers included in the first cluster of physical computer nodes and the second availability monitor uses a second referencing system to identify computers included in the second cluster of physical computer nodes and wherein the first referencing system is different than the second referencing system.

37. The computer system of claim 36, wherein the second physical computer node is configured to host the virtual machine received from the first physical computer node.

38. The computer system of claim 36, wherein the virtual machine comprises an abstract representation of the computer system.

39. The computer system of claim 36, wherein the first and second availability monitors are automated.

40. The computer system of claim 36, wherein the first availability monitor and the second availability monitor are accessed using a web interface.

41. The computer system of claim 40, wherein the web interface is used to configure the second availability monitor to receive the virtual machine from the first availability monitor.

42. The computer system of claim 40, wherein the web interface is used to define the triggering event.

43. The computer system of claim 36, wherein the web interface resides on a computer having access to the first and second availability monitors.

44. The computer system of claim 36, wherein the first availability monitor and the second availability monitor are accessed using the meta language.

45. The computer system of claim 36, wherein the first availability monitor monitors the virtual machine hosted on the first physical computer node in accordance with a relocation policy.

46. A system for managing resource groups, comprising:
- a first plurality of physical computer nodes, each physical computer node comprising a processor, arranged in a first cluster, a first physical computer node of the first plurality of physical computer nodes hosting at least first resource comprising a virtual machine, the first physical computer node being identified by a meta language;
- a first availability monitor comprising a first agent resident on the first physical computer node configured to monitor the first plurality of physical computer nodes and the at least first resource, the first availability monitor being further configured to communicate with the first agent using a first communications protocol;
- a second plurality of physical computer nodes, each physical computer node comprising a processor, arranged in a second cluster, a second physical computer node of the second plurality of physical computer nodes being identified by the meta language;
- a second availability monitor comprising a second agent resident on the second physical computer node configured to monitor the second plurality of physical computer nodes, the second availability monitor being further configured to communicate with the second agent using a second communications protocol;
- admission control criteria that specifies requirements of a node for hosting the virtual machine;
- a relocation policy that specifies a triggering event under which the at least first resource will be relocated; and
- a web interface configured to use the meta language to automatically relocate the at least first resource from the first physical computer node to the second physical computer node upon the occurrence of the triggering event sensed by the first availability monitor and upon a determination that the second physical computer node in the second cluster satisfies the admission control criteria, wherein the meta language that enables the first availability monitor to communicate with the second availability monitor is different from the first communications protocol and the second communications protocol and wherein the first availability monitor is distinct from the second availability monitor and uses a first referencing system to identify computers included in the first cluster of physical computer nodes and the second availability monitor uses a second referencing system to identify computers included in the second cluster of physical computer nodes and wherein the first referencing system is different than the second referencing system.

47. The computer system of claim 46, wherein the second physical computer node is configured to host the virtual machine received from the first physical computer node.

48. The computer system of claim 46, wherein the virtual machine comprises an abstract representation of the computer system.

49. The computer system of claim 46, wherein the first and second availability monitors are automated.

50. The computer system of claim 46, wherein the first availability monitor and the second availability monitor are accessed using a web interface.

51. The computer system of claim 50, wherein the web interface is used to relocate the virtual machine from the first physical computer node to the second physical computer node.

52. The computer system of claim 50, wherein the web interface is used to configure the second availability monitor to receive the virtual machine from the first availability monitor.

53. The computer system of claim 50, wherein the web interface is used to define the triggering event.

* * * * *